United States Patent [19]

Fritz et al.

[11] 4,019,970
[45] Apr. 26, 1977

[54] PROCESS FOR MAKING TITANIUM-SUPPORTED LEAD ELECTRODE

[75] Inventors: Heinz Peter Fritz; Dietrich Wabner, both of Munich; Rainer Huss, Augsburg-Hochzoll, all of Germany

[73] Assignee: Rheinisch-Westfalisches-Elektrizitatswerk Aktiengesellschaft, Essen, Germany

[22] Filed: Sept. 16, 1975

[21] Appl. No.: 613,797

[30] Foreign Application Priority Data

Sept. 18, 1974 Germany .......................... 2444691

[52] U.S. Cl. .................. 204/32 R; 204/42; 204/57; 204/129.75
[51] Int. Cl.² .......................................... C25B 1/30
[58] Field of Search ........ 204/57, 32 R, 42, 129.75

[56] References Cited

UNITED STATES PATENTS

| 3,463,707 | 8/1969 | Gibson et al. ...................... 204/57 |
| 3,650,861 | 3/1972 | Angell ............................ 204/32 R |
| 3,935,082 | 1/1976 | Fritz et al. ......................... 204/57 |

*Primary Examiner*—R. L. Andrews
*Attorney, Agent, or Firm*—Karl F. Ross; Herbert Dubno

[57] ABSTRACT

In making a lead electrode for a lead-acid accumulator or the like, a supporting body of titanium is pickled in a boiling solution of oxalic acid and then adsorptively coated with a titanium (IV) layer in a treatment bath. This treatment is followed by the anodic coating of the titanium body with $PbO_2$ in an electrolyte containing the ions of lead (II), in the presence of a lead (II) nitrate or a lead (II) salt of an amido, imido, nitrido or fluoro sulfate or phosphate. The treatment bath may be an aqueous solution of an organic titanium salt, the pickling solution, or the electrolyte. If the pickling solution is used for this purpose, the titanium body is anodically connected or the solution is oxygenated. If the electrolyte is utilized, Ti(IV) ions are introduced into that liquid in which the titanium body is immersed for an extended period before closure of the anodizing circuit.

6 Claims, No Drawings

PROCESS FOR MAKING TITANIUM-SUPPORTED LEAD ELECTRODE

FIELD OF THE INVENTION

Our present invention relates to the manufacture of an electrode which contains lead oxide as an active material, as used in lead-acid accumulators or for electrolytic purposes.

BACKGROUND OF THE INVENTION

Solid electrodes of lead oxide are mechanically weak and are thus of limited practical utility. Use is therefore frequently made of an inert metallic support, such as a plate or a grid, which is coated with lead oxide $PbO_2$, preferably by electrolytic deposition. Such a support advantageously consists of titanium; however, firmly adhering coatings of lead oxide have heretofore been achieved on titanium bodies only by relatively complicated and costly processes.

In commonly owned U.S. patent application Ser. No. 468,804 filed May 10, 1974, now U.S. Pat. No. 3,935,082, there has been disclosed a process for manufacturing electrodes of this nature. According to that prior patent, a titanium body is cleansed in a hot mordanting or pickling solution of aqueous oxalic acid, this operation being followed by prolonged immersion in the same bath in which a titanium-oxalato complex has been dissolved. Thereafter, the titanium body is anodically connected against a suitable counterelectrode in an electrolyte containing the ions of lead (II) in the presence of a Pb(II) salt of an amido, imido, nitrido or fluoro sulfate or phosphate. A final treatment stage may comprise prolonged immersion in a weakly alkaline medium.

Though the process described in the prior application has been practiced successfully, and is also fully reproducible, there has as yet not been established a comprehensive theory which would allow the development of a variety of techniques for the formation of different types of $PbO_2$ deposits firmly adhering to the supporting titanium body.

OBJECT OF THE INVENTION

The object of our present invention, therefore, is to provide a process for effectively obviating the formation of poorly conductive or practically nonconductive oxide layers on a titanium substrate to be laden with lead oxide.

SUMMARY OF THE INVENTION

We have found, in accordance with the present invention, that such oxide formation can be effectively inhibited by the adsorptive coating of the titanium substrate with a titanium (IV) layer prior to the deposition of $PbO_2$ thereon from a suitable electrolyte, such as those described in U.S. Pat. No. 3,935,082.

Such an adsorptive Ti(IV) layer, whose thickness is not critical, may be formed in a variety of treatment baths, specifically in the pickling solution used in the initial cleansing step or in the electrolyte serving for the anodic deposition of $PbO_2$. In the first instance, the titanium body may be anodically connected in the pickling or mordanting solution (which is not necessarily limited to oxalic acid but may be any liquid capable of dissolving titanium) and/or that solution may be oxygenated by the introduction of air, oxygen or some other oxidizing agent into same. In the second instance, the titanium body may be exposed for an extended period to the electrolyte before the anodic circuit is closed, the electrolyte being enriched in this case with Ti(IV) ions by the prior dissolution of a suitable titanium compound therein.

There exists also the possibility of immersing the titanium body, after pickling and before anodization, in a preferably boiling aqueous solution of a Ti(IV) salt of an organic acid, advantageously a chelating agent such as ethylenediaminetetracidic acid (EDTA).

We have found, in accordance with this invention, that the presence of an adsorptive Ti(IV) coating in a titanium substrate establishes an electrochemical surface potential substantially different from that of a body covered with Ti(III). As a result of this difference in potential, the flow of anodizing current in the electrolyte does not cause an initial surface oxidation of the substrate but brings about an immediate deposition of lead oxide thereon, possibly accompanied by a lead titanate.

Suitable electrolytes include not only the aforementioned solutions of lead(II) salt of an amido, imido, nitrido or fluoro derivative of sulfuric or phosphoric acid, as noted in U.S. Pat. No. 3,935,082, but also the lead(II) salt of nitric acid.

EXAMPLE I

A titanium body in the form of an expanded-metal sheet or a solid plate is subjected to the following steps:

a. Pickling for one hour in aqueous oxalic acid at 15% concentration and at 100° C.

b. Immersion for two hours in a boiling EDTA/Ti(IV) solution.

c. Anodic coating with lead oxide from a Pb(II) electrolyte as described above, e.g. a solution of Pb(II) amido sulfate ranging in conductivity between $10^{-3}$ and $10^{-4}$ mho.cm$^{-1}$. The electrolyte may be maintained at 65° C and the current flow, e.g. of 20 mA/cm$^2$, may be periodically interrupted as described in the commonly owned U.S. Pat. No. 3,935,082.

d. Rinsing of the fully coated electrode in water, e. Treatment for two hours in a boiling aqueous solution of NaOH with pH ≈ 8.

The result is a dense, firmly adhering layer of lead oxide, comparable to that obtained by the process of the aforementioned patent.

EXAMPLE II a. Same as in Example I.

b. The titanium body remains immersed in the pickling solution of step (A) for at least half an hour and is anodically biased, with a current flow of about 10 to 20 mA/cm$^2$.

c. – e. Same as in Example I, with similar result.

EXAMPLE III a. Same as in Example I.

b. The titanium body is left immersed in the pickling solution of step (a), reduced to a temperature of 50° C, with bubbling of air or oxygen through the solution until the color of the body has changed from dark brown to light yellow. This is followed by boiling in the solution for one hour.

c. – e. Same as in Example I, with similar result.

EXAMPLE IV a. Same as in Example I.

b. 30% hydrogen perioxide is admixed, as an oxygenating agent, with the pickling solution used in step (a), in a proportion of about 5% by volume. The titanium body is boiled for two hours in this mixture.

c. – e. Same as in Example I. The result is a highly fine-grained, firmly adhering $PbO_2$ layer.

EXAMPLE V a. Same as Example I.

b. Immersion for at least 30 minutes in an electrolyte of Pb(II) nitrate in which a small quantity of titanium nitrate has been dissolved to supply Ti(IV) ions to the bath.

c. Anodization, as in Example I, in the bath of step (b), followed by steps (d) and (e) of Example I. The result is a glossy, deep-black, smooth coating of lead oxide.

Step (e) may be omitted in some instances. The pickling or mordanting bath of step (a) and the electrolyte of step (c) may be modified, as discussed above, and an additional treatment with a titanium-oxalato complex as described in the prior U.S. Pat. No. 3,935,032 may be inserted between steps (b) and (c), if desired, especially in Examples I – IV. Between steps (c) and (d) a second electrodeposition may be carried out, as also described in the prior application and patent, with an electrolyte containing only lead nitrate; this is particularly advantageous in the case of Example V to enhance the gloss and the smoothness of the coating.

We claim:

1. A process for making an electrode containing lead oxide as an active material, comprising the steps of:
    a. immersing a body of titanium in a hot aqueous solution of oxalic acid for cleansing said body;
    b. adsorptively coating the cleansed titanium body with a layer of titanium (IV) by immersing said body for a prolonged period in a treatment bath consisting essentially of a boiling aqueous solution of a Ti(IV) salt of ethylenediaminetetraacetic acid; and
    c. anodically coating the titanium body, treated in step (b), with $PbO_2$ in an electrolyte containing Pb(II) ions.

2. A process for making an electrode containing lead oxide as an active material, comprising the steps of:
    a. immersing a body of titanium in a hot aqueous solution of oxalic acid for cleansing said body;
    b. anodically biasing the cleansed titanium body in said aqueous solution for a time sufficient to coat said body with a layer of titanium (IV); and
    c. anodically coating the titanium body, treated in step (b), with $PbO_2$ in an electrolyte containing Pb(II) ions.

3. A process for making an electrode containing lead oxide as an active material, comprising the steps of:
    a. immersing a body of titanium in a hot aqueous solution of oxalic acid for cleansing said body;
    b. adsorptively coating the cleansed titanium body with a layer of titanium (IV) by prolonged immersion of said body in said aqueous solution in the presence of an oxygenating agent; and
    c. anodically coating the titanium body, treated in step (b) with $PbO_2$ in an electrolyte containing Pb(II) ions.

4. A process as defined in claim 3 wherein said oxygenating agent is a flow of oxygen-rich gas bubbled through said solution.

5. A process as defined in claim 3 wherein said oxygenating agent is an admixture of hydrogen peroxide.

6. A process for making an electrode containing lead oxide as an active material, comprising the steps of:
    a. immersing a body of titanium in a hot aqueous solution of oxalic acid for cleansing said body;
    b. absorptively coating the cleansed titanium body with a layer of titanium (IV) by immersion in an electrolyte containing Pb(II) ions together with Ti(IV) ions; and
    c. anodically coating the titanium body, treated in step (b), with $PbO_2$ in said electrolyte.

* * * * *